Oct. 14, 1958    H. S. SEELIG ET AL    2,856,347
PROCESS FOR PURIFICATION OF REFORMING CHARGE STOCK
Filed July 28, 1954
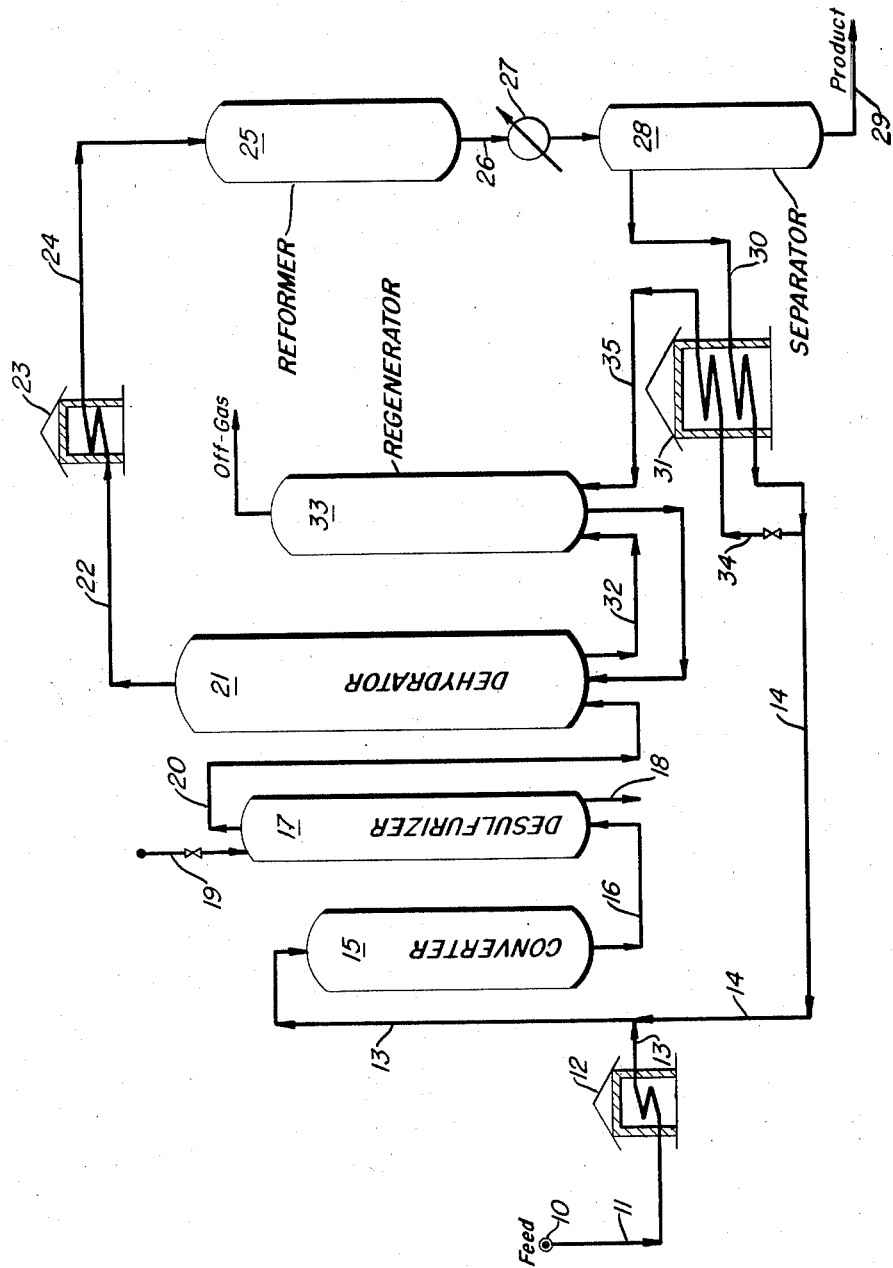
INVENTORS:
Herman S. Seelig
Alfred A. Brooks
BY
ATTORNEY

United States Patent Office 2,856,347
Patented Oct. 14, 1958

2,856,347

PROCESS FOR PURIFICATION OF REFORMING CHARGE STOCK

Herman S. Seelig, Valparaiso, Ind., and Alfred A. Brooks, Kalamazoo, Mich., assignors to Standard Oil Company, Chicago, Ill., a corporation of Indiana Application July 28, 1954, Serial No. 446,296

8 Claims. (Cl. 208—89)

Our invention relates to improvements in the catalytic reforming of hydrocarbon charge stocks in the presence of hydrogen and a platinum type reforming catalyst.

Although platinum type reforming catalysts have high activity and selectivity in reforming hydrocarbon charge stocks such as straight run naphthas to produce high octane number gasolines, the platinum type catalyst is particularly sensitive to poisons. Nearly all hydrocarbon charge stocks contain significant quantities of combined non-hydrocarbon elements particularly oxygen and sulfur which, under the conditions of the reforming reaction, convert respectively to water vapor and hydrogen sulfide. It is not known whether the form in which the oxygen and sulfur are combined is consequential, but it is known that the presence of oxygen or sulfur, whether in combined form in the feed or as water vapor and hydrogen sulfide in hydrogen recycle gas employed in the process, has a number of undesirable effects. The presence of as much as 0.1 mole percent of either water vapor or hydrogen sulfide in the reaction mixture has been found to reduce liquid yield by as much as 2 volume percent. Since a typical charge stock to a catalytic hydroforming process may contain up to 0.5 weight percent total oxygen (converting to 0.5 mole percent water vapor) and also may contain as much as 0.2 weight percent combined sulfur (converting to 0.2 mole percent hydrogen sulfide), the loss of potential liquid yield occasioned by oxygen and/or sulfur in the feed is apparent.

In addition to the yield loss, the presence of water vapor and/or hydrogen sulfide in the reaction zone has a serious effect on the useful life of the platinum reforming catalyst. The presence of either causes more rapid deactivation of the catalyst. Moreover, it is more difficult to regenerate or rejuvenate platinum reforming catalysts which have been fouled by running high sulfur feed stocks.

Our invention provides inexpensive and simple means which are easily integrated into conventional catalytic hydroforming operations for removing substantially all of the oxygen and/or sulfur which may be present in the charge stock. Thus it provides substantial operating advantages in the way of improved liquid yield for a given octane level, improved catalyst life and easier regenerability of catalyst. In addition, it permits greater flexibility in operation because a broader selection of feed stocks is made available without limitation on processing severity because of high oxygen or sulfur content. The invention provides these benefits using a low cost reagent which can be discarded when spent or, when fouled by water vapor removal, can be regenerated simply by contacting at elevated temperature with excess gas make of the hydroforming process. Process heat is conserved because the invention can be practiced at reforming temperature level without cooling, condensing and reheating purified feed prior to charging to the reforming reaction.

According to the invention, the charge to the hydroforming operation is treated in the presence of a catalyst under conditions which convert oxygen compounds and sulfur compounds in the charge by hydrogenation to water vapor and hydrogen sulfide respectively. For example, the charge with hydrogen is passed through a conversion zone containing a hydrogenation catalyst at an elevated temperature of the order of 600° F. to 800° F., which is sufficient to effect the desired conversion. Any solid hydrogenation catalyst of suitable activity and sulfur resistance may be used, but spent platinum-alumina reforming catalyst can be utilized advantageously since the desired conversions are readily effected. For simplicity of operation, it is desirable to employ a pressure sufficiently higher than the desired hydroforming pressure to allow for normal pressure drop through the system and to use hydrogen recycled from the hydroforming reaction. The effluent from the oxygen and/or sulfur conversion zone is passed through an adsorption zone where it is brought into contact with particle form calcium oxide. At temperatures up to about 700° F., upwards of 80% of the water vapor is removed while the removal of hydrogen sulfide is substantially quantitative. For efficient contact, the calcium oxide is best handled in finely divided form and maintained in a fluidized state in the zone of contact.

In the adsorption zone, water vapor is removed by reaction with the lime contact medium to form calcium hydroxide. Hydrogen sulfide is removed by reaction with the lime to form calcium sulfide. Lime which has been spent by formation of calcium hydroxide to an extent interfering with efficient removal of water vapor can be readily regenerated by heating to a temperature of about 800° F. at atmospheric pressure. In one aspect of our invention, the lime contacting operation in the adsorption zone is conducted in two stages. In the first stage, the effluent from the water vapor and hydrogen sulfide conversion zone is contacted with a relatively small body of lime at about 700–800° F. Removal of hydrogen sulfide is rapid and substantially complete under these conditions. The effluent then is contacted with additional lime, advantageously after cooling to a somewhat lower temperature, e. g. 500°–600° F., to remove the bulk of the water vapor. Spent lime from the hydrogen sulfide removal operation is discarded, while spent lime from the water vapor removal operation is regenerated by contacting it with excess dry gas produced in the hydroforming process.

The accompanying drawing illustrates application of the invention in the form of a simplified flow plan and will be described in conjunction with an example of one specific mode of operation.

The feed to the process illustrated in the drawing constitutes a virgin West Texas naphtha having a boiling range of 100°–400° F. and, assuming 3 moles of hydrocarbon per barrel of feed, having a concentration of 0.09 mole oxygen and 0.02 mole sulfur. The feed from source 10 and line 11 is preheated in fired heater 12 to a temperature of 600° F. The pressure maintained is about 325 p. s. i. g. The preheated feed in line 13 is mixed with 15 moles of hydrogen rich gas, recycled by line 14 from the reforming reaction at the rate of 5000 s.c.f./barrel. The recycle gas normally contains 60 to 90% hydrogen with the balance hydrocarbons except for 0.0178 mole water vapor. The charge mixture is passed through convertor 15 in which is maintained a bed of spent platinum-alumina reforming catalyst. The space velocity through the reactor is 12 LHSV in the example although the space velocity may be varied over a broad range comprising about 1–100 LHSV. Under the illustrated conditions, practically no reforming takes place over the spent catalyst, but essentially all the oxygen and sulfur in the charge are converted to water vapor and hydrogen sulfide.

The effluent from convertor 15, comprising 15 moles of recycle gas, 3 moles of hydrocarbon charge, 0.108 mole water and 0.02 mole hydrogen sulfide, is introduced by means of line 16 to contact vessel 17. The contact vessel 17 is charged with a body of finely divided calcium oxide which is maintained in the form of a fluidized bed above a grid below which the gaseous effluent mixture from convertor 15 is admitted. The contact vessel 17 is sized to provide a superficial linear vapor velocity in the vessel of about 1–3 feet per second. Internally and externally arranged cyclone separators and/or filters are suitably provided to prevent carry-over of fines. At 600° F., the partial pressure of hydrogen sulfide is reduced in contact with the calcium oxide to essentially 0 ($\sim 10^{-5}$ p. s. i.). Some water vapor in the incoming gas mixture reacts with calcium oxide to form calcium hydroxide but this is converted ultimately to calcium sulfide. In view of the difficulty of regenerating calcium sulfide and the low cost of calcium oxide, spent lime, usually after conversion to upwards of 50% calcium sulfide, is discarded from the system as by line 18. Make-up calcium oxide may be added by means of line 19.

The desulfurized mixture then is passed by line 20 to dehydrator 21 where it is introduced below a fluidized bed of finely divided calcium oxide by maintaining a linear vapor velocity through the dehydrating vessel 21 of about 1 to 3 feet per second. At 600° F. and a hydrogen-to-oil ratio of 5/1, the desulfurized mixture entering the dehydration zone of vessel 21 contains approximately 0.6 mole percent water. Under these conditions, the water vapor content of the incoming desulfurized mixture is reduced to about 0.12 mole percent. The effluent from vessel 21, after passing through a suitable cyclone and/or filter system to remove fines, is charged by line 22 to fired heater 23 in which it is raised to a temperature of about 920° F. The preheated charge by line 24 is passed to reforming reactor 25. A single reactor may be employed containing a fixed bed of pelleted platinum-alumina catalyst or a fluidized bed of finely divided catalyst. If a fixed bed reaction system is used, it is desirable to employ a series of reactor vessels equipped for interheating to compensate for endothermic temperature drop in the reaction zone. The effluent from reforming reactor 25 is passed by line 26 through cooler 27, in which it is cooled to about 70° F., and thence to separator 28. In separator 28, hydrogen rich recycle gas separates from condensable hydrocarbons which are withdrawn as indicated by connection 29. The hydrogen rich recycle gas is passed by line 30 through a coil of fired heater 31 to line 14 for recycle.

In the example illustrated in the drawing, a stream of calcium oxide contact material from dehydrator 21 is regenerated continuously by withdrawing through line 32 to regenerator 33. In the regenerator 33, the lime is maintained in a fluidized state over a grid, below which is admitted a stream of inert purge gas. As shown, excess gas make from the reforming process is removed from line 14 by valved connection 34 and after passage through a coil of fired heater 31 is introduced by line 35 below the grid of regenerator 33. Operating at a 50–50 mole ratio of calcium oxide to calcium hydroxide, the equivalent of 0.09 mole of water, i. e., 0.09 mole of calcium oxide (5.0 pounds) and 0.09 mole of calcium hydroxide (6.7 pounds) per barrel of feed is removed. The equilibrium vapor pressure of water at 780° F. in the regenerator is 5.6 pounds so that all of the water present enters the excess dry gas stream, which typically runs about 1000 s.c.f./bbl. About 650 B.t.u. per barrel of feed is required under these conditions to heat the spent calcium oxide. The heat required to heat the recycling gas is about 12,500 B.t.u. per barrel of feed, with about 80 percent hydrogen and 20 percent methane in the dry make gas. The bulk of this heat however can be readily recovered by heat exchange in the over-all process so that the total heat consumption in the operating example is less than about 750 B.t.u. per barrel of feed.

Although the first convertor is ordinarily operated at the relatively mild conditions usually associated with hydrogenation, severity may be increased to an extent promoting dehydrogenation of naphthenes in the feed when a hydrogenation catalyst having reforming activity is used. Thus with a platinum-alumina, a chromium oxide-alumina or a molybdenum oxide-alumina type catalyst, temperatures up to about 850°–875° F. at space velocities as low as about 1 to 2 LHSV may be used. Under these conditions, the effect of feed concentrations of oxygen and sulfur are less pronounced than in conventional reforming, and of course there is no build-up of oxygen and sulfur in the recycle gas. Accordingly, conditions in the first conversion zone and where oxygen and sulfur compounds are converted may vary from about 500° F. to about 850° F. at pressures of about 50–500 p. s. i. g. Although separate recycle gas systems can be employed, it is advantageous to recycle hydrogen rich gas from the reforming stage to the first conversion stage and thence with the charge through the entire process system at hydrogen-to-hydrocarbon ratios in the range desired for reforming, normally about 2/1 to 10/1. In addition to the reforming type catalysts having hydrogenation activity, other hydrogenation catalysts, for example metal type catalysts such as supported nickel or palladium catalysts may be employed in the first conversion zone. Spent platinum-alumina reforming catalysts ordinarily retain considerable hydrogenation activity and it is often advantageous to use catalyst discarded from the reforming catalyst in the first conversion zone.

The calcium oxide contact medium of the adsorption zone should have as much available surface as feasible for efficiency of contacting. Consequently, it is advantageous to employ the calcium oxide contact medium in finely divided form as a fluidized mass. It is possible, however, to handle calcium oxide in the form of a fixed bed or a gravity flow bed of larger size particles. Although a dual contact system has been shown in the example of the drawing, it is sometimes economically desirable to eliminate the separate desulfurization contactor and allow the calcium sulfide to accumulate in the dehydration system. Calcium oxide then is charged to the contactor at a rate compensating for discharge of spent lime as calcium sulfide. It is usually advantageous, however, to apply regeneration because formation of calcium hydroxide on the surface of the lime contact medium has a greater limiting effect on efficiency of contact than formation of calcium sulfide. The dual contact system of the example of the drawing also may be modified in operation by transferring a stream of calcium oxide-calcium hydroxide mixture from the dehydrator forward into the desulfurization contactor. The resulting calcium oxide-calcium sulfide-calcium hydroxide mixture formed is eventually discarded.

The primary factors controlling the effectiveness of hydrogen sulfide and water vapor removal by reaction in the lime contact zone are temperature, pressure, hydrogen-to-hydrocarbon ratio and percent of sulfur or oxygen in the feed. At 215 p. s. i. g., 4/1 hydrogen-to-hydrocarbon ratio and 0.2 percent sulfur in the feed, sulfur is removed substantially quantitatively up to about 700° F. Even at higher temperatures, 90–99 percent removal is readily obtained without requiring substantial increase in pressure or decrease in hydrogen-to-hydrocarbon ratio. Under similar operating conditions and with 0.5 percent oxygen, about 90 percent of the oxygen is removed at temperatures up to about 600° F. By increasing the pressure, or decreasing the temperature and/or the hydrogen-to-hydrocarbon ratio, up to about 99 percent removal can be accomplished. Thus, calcium oxide has the special advantage as contact material that it is effective in removing hydrogen sulfide and water under the conditions of elevated temperature and relatively high hydrogen-to-hydrocarbon ratio prevailing normally in a catalytic hydroforming reaction system. Although calcium oxide can be used to treat the total effluent from the hydroforming reactor, before or after cooling by suitable heat exchange, or can be used to treat the recycle hydrogen gas stream in the conventional hydroforming process for removal of hydrogen sulfide and water vapor, these methods of application appear to be less attractive. Buildup of hydrogen sulfide and water vapor in the recycle gas stream can be prevented in this way, but the catalyst in the reaction zone will still be exposed to the deleterious effect of sulfur and oxygen in the feed.

The conditions of operation in the reforming zone are conventional except that if some reforming is conducted in the first conversion zone, this should be taken into account in selecting the severity of conditions in the reforming zone proper. In general, an average temperature in the reforming zone in the range of about 900° F. to 975° F. is desirable at a pressure in the range of about 100–750 p. s. i. g. Yield benefits for a given octane level are promoted by operation in the lower pressure range. A liquid hourly space velocity of about 0.5–10, depending chiefly on the naphthenes content of the feed stock, should be employed. The catalyst is a platinum type reforming catalyst; see, for example, U. S. Patent Numbers: 2,667,461; 2,659,701; 2,560,329; 2,550,531; 2,479,109; 2,478,916; 2,475,155. It is desirable, however, to use a platinum-alumina type catalyst which does not depend upon promoters of the halide type and which can be subjected to periodic or continuous regeneration as may be desired to maintain high activity level for long periods of on-stream time without shut down for catalyst replacement.

We claim:

1. In the reforming of hydrocarbon charge stocks in the presence of a platinum-alumina reforming catalyst and hydrogen, a process for purifying the charge stock which comprises treating the charge stock in the presence of a hydrogenation catalyst and hydrogen at an elevated temperature whereby substantially all oxygen and sulfur compounds in the charge are converted to water vapor and hydrogen sulfide respectively and contacting the total effluent from said treating operation in the vapor phase with solid particle form calcium oxide under conditions effecting substantial removal of water vapor and hydrogen sulfide from the effluent.

2. The process of claim 1 in which the hydrogenation catalyst comprises a spent platinum-alumina reforming catalyst.

3. The process of claim 1 in which the calcium oxide is in finely divided form and maintained in a fluidized state in the contacting operation.

4. The process of claim 1 in which the total effluent is first contacted in the vapor phase with a small portion of the calcium oxide under conditions favoring removal of hydrogen sulfide and then is contacted with the bulk of the calcium oxide under conditions favoring water vapor removal.

5. In the reforming of hydrocarbon charge stocks in the presence of a platinum-alumina reforming catalyst and hydrogen, a combination process which comprises passing the charge stock and hydrogen through a first conversion zone in contact with a body of platinum-alumina catalyst at an elevated temperature whereby substantially all oxygen compounds and sulfur compounds in the charge are converted to water vapor and hydrogen sulfide respectively, passing the total effluent from the first conversion zone in the vapor phase through an adsorption zone in contact with a body of solid particle form calcium oxide under conditions effecting substantial removal of water vapor and hydrogen sulfide, passing the effluent from the adsorption zone through a second conversion zone in contact with a platinum-alumina reforming catalyst under reforming conditions, separating condensable hydrocarbons and hydrogen rich gas from the effluent of the second conversion zone and recycling the hydrogen rich gas within the process.

6. The process of claim 5 in which the calcium oxide is in finely divided form and is maintained in a fluidized state in the adsorption zone.

7. The process of claim 5 in which the total effluent from the first conversion zone is contacted in the vapor phase in the adsorption zone first with a relatively small body of calcium oxide for hydrogen sulfide removal and then with a relatively large body of calcium oxide for water vapor removal.

8. The process of claim 5 in which calcium oxide which has been reduced in capacity to remove water vapor by formation of calcium hydroxide is regenerated by contacting the spent lime with excess gas produced in the reforming process at a temperature of at least about 800° F.

References Cited in the file of this patent

UNITED STATES PATENTS

| | | |
|---|---|---|
| 88,978 | Parsons | Apr. 13, 1869 |
| 2,202,401 | Rosen | May 28, 1940 |
| 2,411,726 | Holroyd et al. | Nov. 26, 1946 |
| 2,642,383 | Berger et al. | June 16, 1953 |
| 2,642,385 | Berger et al. | June 16, 1953 |
| 2,671,754 | De Rosset et al. | Mar. 9, 1954 |
| 2,691,623 | Hartley | Oct. 12, 1954 |
| 2,730,556 | Liedholm | Jan. 10, 1956 |
| 2,749,287 | Kirshenbaum | June 5, 1956 |
| 2,758,064 | Haensel | Aug. 7, 1956 |

OTHER REFERENCES

Greogory: Uses and Application of Chemicals and Related Materials, page 141 (1939).